Patented Feb. 21, 1950

2,498,227

UNITED STATES PATENT OFFICE 2,498,227

ANTIHISTAMINES AND PREPARATION OF THE SAME

Leslie Hunt Sutherland, Jr., Springdale, Conn., assignor to American Cyanamid Company, New York, N. Y., a corporation of Maine No Drawing. Application December 26, 1947, Serial No. 794,097

9 Claims. (Cl. 260—296)

This invention relates to new organic compounds having useful therapeutic properties and to processes of preparing the same.

The new compounds of the present invention may be represented by the following formula:

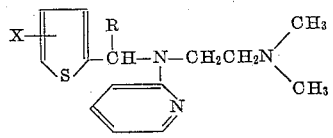

in which X is hydrogen or a halogen and R is an alkyl radical. Acid salts of these new compounds may be prepared by simple treatment with an acid and are included within the scope of the invention.

Compounds defined by the above formula, and the acid salts thereof, have been found to possess anti-histaminic properties equal to other compounds now available on the market. Such compounds are useful in the alleviation of symptoms of hay fever and other respiratory allergies, certain types of asthma, food allergies, urticarial dermatoses, atopic dermatitis, reactions to penicillin and sulfonamides, and other reactions in which histamine is believed to be a causative factor.

The new compounds of the present invention may be prepared by reacting an alpha-2-thienyl alkyl halide with an alkali metal salt of dimethylaminoethylaminopyridine. This latter reaction will take place at temperatures from about $-10°$ C. to 150° C. or higher. The reaction is conducted in an inert non-hydroxylated organic solvent, preferably a hydrocarbon such as benzene or toluene, under substantially anhydrous conditions. Alternatively, the same products can be obtained by reacting a 2-halopyridine with N,N-dimethyl-N'-(omega-alkyl-2-thenyl) ethylendiamine in the presence of an alkaline substance such as quinoline, pyridine, diethylamine, sodium hydroxide, sodium bicarbonate, or the like at temperatures from about 0° C. to 180° C.

The symbol X in the general formula above may be hydrogen or one or more of chlorine, fluorine, bromine, or iodine. The halogenated products are most readily prepared by using as the intermediate an alpha-2-thienyl alkyl halide having one or more halogen atoms on one or more of the remaining positions on the thiophene ring. The symbol R represents an alkyl radical such as methyl, ethyl, butyl, propyl, amyl, or the like.

The preparation of representative compounds within the scope of the present invention will now be described in specific examples. Inasmuch as certain of the intermediates appear to be new compounds, a description of their preparation will be included. All parts are by weight unless otherwise indicated. It should be understood that these examples represent preferred embodiments of the present invention and are not to be construed as limiting the scope thereof to the particular compounds or details of the preparation.

Example 1

Alpha-2-thienylethanol having a boiling point of 89° to 92° C. at 11 mm. of mercury was prepared by the well known Grignard reaction from 0.75 mol of methyl magnesium iodide and 0.58 mol of 2-thiophenealdehyde in 50 cc. of anhydrous ether. A solution of 30 parts of alpha-2-thienylethanol in 132 parts of benzene was slowly saturated with anhydrous hydrogen bromide for 40 minutes. The product was dried and distilled in vacuum.

3.9 parts of sodamide was prepared in 200 parts of liquid ammonia. This was treated with 17 parts of dimethylaminoethylaminopyridine, and the resulting mixture was treated dropwise with 9 parts of alpha-2-thienylethyl bromide. Finally the ammonia was evaporated off while being replaced with toluene. The toluene solution was washed, dried, and distilled in vacuum. The product, N,N - dimethyl - N' - (2 - pyridyl) - N'- (omega - methyl - 2 - thenyl) ethylene - diamine boiled at 1 mm. pressure at 150°–151° C. The index of refraction was $n_D^{27} = 1.575$.

Example 2

2-thienylbutanol was prepared in 84.1% yield from 2-thiophenealdehyde and propyl magnesium bromide by the method of the preceding example. This alcohol was also converted to the bromide as above.

The sodium salt of 46 parts of dimethylaminoethylaminopyridine was prepared in boiling toluene by treatment with sodium hydride. This was cooled, and 30 parts of 2-thienylpropylcarbinyl bromide was added dropwise. The resulting mixture was heated on the steam bath and finally hydrolyzed. The product, N,N-dimethyl - N' - (2 - pyridyl) - N'-(omega-propyl-2-thenyl) ethylene-diamine boiled at 1 mm. pressure at 140°–145° C.

Example 3

The Grignard reagent of 0.4 mole of n-propyl bromide in 400 cc. of ether was treated with 0.2 moles of 5-chloro-2-thiophenealdehyde (M. P.

about 23° C.) dissolved in 250 cc. of ether. The resulting (5 - chloro-2-thienyl) propylcarbinol boils at 105° C./2 mm.

The (5 - chloro-2-thienyl) propylcarbinol was dissolved in benzene and cooled while an excess of anhydrous HBr was bubbled through the solution. The solvent was removed by distillation, and the undistilled product was added to a suspension of sodium dimethylaminoethylaminopyridine in toluene. The mixture was heated for 3½ hours at 95° C., hydrolyzed with water, and distilled. The product, N,N - dimethyl - N'-(2-pyridyl)-N'-(omega-propyl-5-chloro- 2 -thenyl) ethylenediamine, boils at 170° C./1 mm.; $n_D^{25}=1.570$. It makes a non-hygroscopic hydrochloride which melts at about 200° C.

In place of the alpha-2-thienyl alkyl bromides used in the preceding examples there may be used the corresponding chloride, fluoride, or iodide.

I claim:

1. Compounds having the general formula

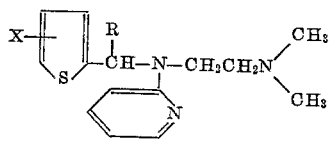

in which X is a member of the group consisting of hydrogen and halogen radicals and R is an alkyl radical, and the acid salts thereof.

2. N,N-dimethyl-N'-(2-pyridyl)-N' - (omega - methyl-2-thenyl) ethylenediamine.

3. N,N-dimethyl-N'-(2-pyridyl)-N' - (omega - propyl-2-thenyl) ethylenediamine.

4. N,N-dimethyl-N'-(2-pyridyl)-N' - (omega - propyl-5-chloro-2-thenyl) ethylenediamine.

5. A method of preparing compounds having the general formula

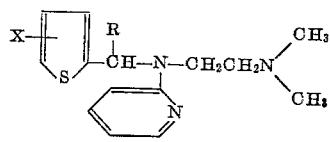

in which X is a member of the group consisting of hydrogen and halogen radicals and R is an alkyl radical, which comprises mixing together under reactive conditions a compound having the formula

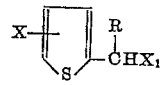

in which X and R are as defined above and $X_1$ is a halogen, and an alkali metal salt of dimethylaminoethylaminopyridine.

6. A method of preparing compounds having the general formula

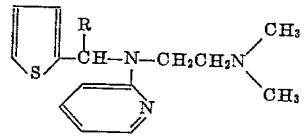

in which R is an alkyl radical, which comprises mixing together under reactive conditions an alpha-2-thienyl alkyl bromide and an alkali metal salt of dimethylaminoethylaminopyridine.

7. A method of preparing N,N-dimethyl-N'-(2-pyridyl)-N'-(omega-methyl - 2 - thenyl)ethylenediamine which comprises mixing together under reactive conditions alpha-2-thienyl ethyl bromide and an alkali metal salt of dimethylaminoethylaminopyridine.

8. A method of preparing N,N-dimethyl-N'-(2-pyridyl) - N' - (omega-propyl-2- thenyl)ethylenediamine which comprises mixing together under reactive conditions 2-thienylpropylcarbinyl bromide and an alkali metal salt of dimethylaminoethylaminopyridine.

9. A method of preparing N,N-dimethyl-N'-(2-pyridyl)-N' - (omega-propyl-5-chloro-2-thenyl)ethylenediamine which comprises mixing together under reactive conditions (5-chloro-2-thienyl)propylcarbinyl bromide and an alkali metal salt of dimethylaminoethylaminopyridine.

LESLIE HUNT SUTHERLAND, Jr.

No references cited.